(12) United States Patent
Erickson et al.

(10) Patent No.: US 8,938,943 B2
(45) Date of Patent: Jan. 27, 2015

(54) GAS TURBINE ENGINE WITH BYPASS MIXER

(75) Inventors: Kaare Erickson, Fishers, IN (US); Randall E. Yount, Indianapolis, IN (US)

(73) Assignee: Rolls-Royce North American Technoloies, Inc., Indianapolis, IN (US)

( * ) Notice: Subject to any disclaimer, the term of this patent is extended or adjusted under 35 U.S.C. 154(b) by 784 days.

(21) Appl. No.: 13/198,958

(22) Filed: Aug. 5, 2011

(65) Prior Publication Data

US 2012/0279198 A1 Nov. 8, 2012

Related U.S. Application Data

(60) Provisional application No. 61/427,599, filed on Dec. 28, 2010.

(51) Int. Cl.
*F02K 3/075* (2006.01)

(52) U.S. Cl.
CPC .................................. *F02K 3/075* (2013.01)
USPC ....................................................... 60/226.3

(58) Field of Classification Search
CPC ............ F02K 3/075; F02K 3/04; F02K 3/025
USPC ............... 60/226.3, 226.1, 262, 771; 415/145
See application file for complete search history.

(56) References Cited

U.S. PATENT DOCUMENTS

| | | | |
|---|---|---|---|
| 3,060,679 A * | 10/1962 | Schmitt | 415/147 |
| 3,779,282 A | 12/1973 | Klees | |
| 4,069,661 A * | 1/1978 | Rundell et al. | 60/204 |
| 4,080,785 A * | 3/1978 | Koff et al. | 60/226.3 |
| 5,136,840 A | 8/1992 | Nash | |
| 5,307,624 A | 5/1994 | Even-Nur et al. | |
| 5,417,056 A | 5/1995 | Johnson et al. | |
| 5,694,767 A | 12/1997 | Vdoviak et al. | |
| 6,102,329 A | 8/2000 | Guinan et al. | |
| 6,901,739 B2 * | 6/2005 | Christopherson | 60/226.3 |
| 7,464,536 B2 | 12/2008 | Renggli et al. | |
| 2004/0006969 A1 | 1/2004 | Whurr | |
| 2008/0163606 A1 | 7/2008 | Cini et al. | |
| 2009/0208328 A1 | 8/2009 | Stern | |
| 2010/0000220 A1 * | 1/2010 | Chaudhry | 60/771 |

FOREIGN PATENT DOCUMENTS

WO    WO 2012092215 A1 * 7/2012

OTHER PUBLICATIONS

International Search Report and Written Opinion, PCT/US2011/067297, Apr. 17, 2012, Rolls-Royce North American Technologies, Inc.

* cited by examiner

*Primary Examiner* — J. Gregory Pickett
(74) *Attorney, Agent, or Firm* — Krieg DeVault LLP

(57) ABSTRACT

One embodiment of the present invention is a gas turbine engine with a bypass mixer. Other embodiments include apparatuses, systems, devices, hardware, methods, and combinations for gas turbine engines and bypass mixers. Further embodiments, forms, features, aspects, benefits, and advantages of the present application will become apparent from the description and figures provided herewith.

17 Claims, 2 Drawing Sheets

GAS TURBINE ENGINE WITH BYPASS MIXER

CROSS REFERENCE TO RELATED APPLICATIONS

The present application claims benefit of U.S. Provisional Patent Application No. 61/427,599, filed Dec. 28, 2010, entitled GAS TURBINE ENGINE WITH BYPASS MIXER, which is incorporated herein by reference.

GOVERNMENT RIGHTS

The present application was made with the United States government support under Contract No. F33615-03-D-2357, awarded by the United States Air Force. The United States government may have certain rights in the present application.

FIELD OF THE INVENTION

The present invention relates to gas turbine engines, and more particularly, gas turbine engines with bypass mixers.

BACKGROUND

Gas turbine engines that produce bypass flow remain an area of interest. Some existing systems have various shortcomings, drawbacks, and disadvantages relative to certain applications. Accordingly, there remains a need for further contributions in this area of technology.

SUMMARY

One embodiment of the present invention is a gas turbine engine with a bypass mixer. Other embodiments include apparatuses, systems, devices, hardware, methods, and combinations for gas turbine engines and bypass mixers. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
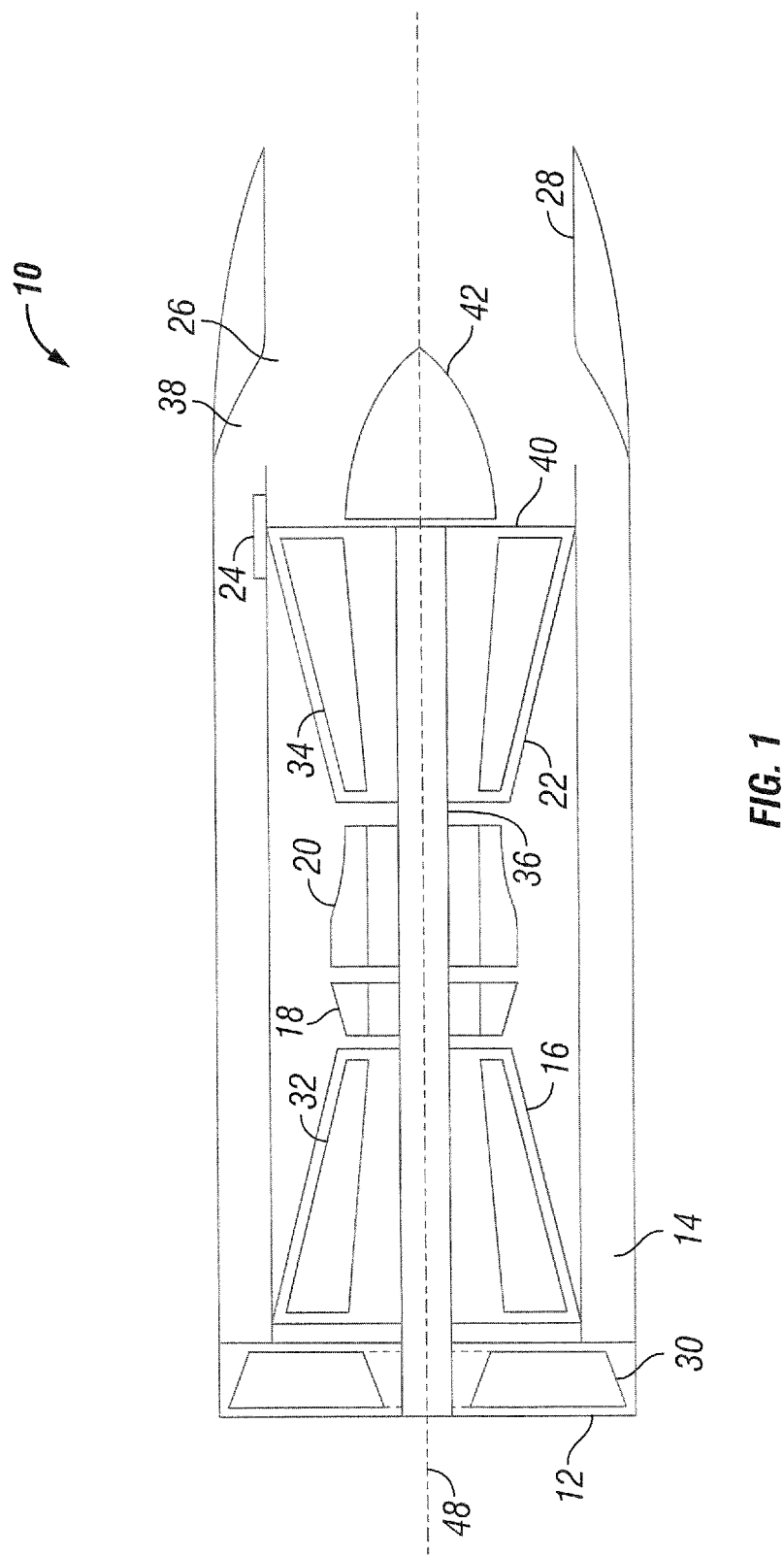
FIG. 1 schematically illustrates some aspects of a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, a non-limiting example of some aspects of a gas turbine engine 10 in accordance with an embodiment of the present invention is schematically depicted. In one form, gas turbine engine 10 is an aircraft propulsion power plant. In other embodiments, gas turbine engine 10 may be a land-based engine or marine engine. In one form, gas turbine engine 10 is a multi-spool turbofan engine. In other embodiments, gas turbine engine 10 may take other forms.

Gas turbine engine 10 includes a fan system 12, a bypass duct 14, a compressor system 16, a diffuser 18, a combustion system 20, a turbine system 22, a bypass mixer 24, a discharge duct 26 and a nozzle 28. Bypass duct 14 and compressor system 16 are in fluid communication with fan system 12. Diffuser 18 is in fluid communication with compressor system 16. Combustion system 20 is fluidly disposed between compressor system 16 and turbine system 22. In one form, combustion system 20 includes a combustion liner (not shown) that contains a continuous combustion process during the operation of engine 10. In other embodiments, combustion system 20 may take other forms, and may be, for example, a wave rotor combustion system, a rotary valve combustion system, or a slinger combustion system, and may employ deflagration and/or detonation combustion processes.

Fan system 12 includes a fan rotor system 30. In various embodiments, fan rotor system 30 includes one or more rotors (not shown) that are powered by turbine system 22. Bypass duct 14 is operative to transmit a bypass flow generated by fan system 12 to nozzle 28. Compressor system 16 includes a compressor rotor system 32. In various embodiments, compressor rotor system 32 includes one or more rotors (not shown) that are powered by turbine system 22. Turbine system 22 includes a turbine rotor system 34. In various embodiments, turbine rotor system 34 includes one or more rotors (not shown) operative to drive fan rotor system 30 and compressor rotor system 32. Turbine rotor system 34 is drivingly coupled to compressor rotor system 32 and fan rotor system 30 via a shafting system 36. In various embodiments, shafting system 36 includes a plurality of shafts that may rotate at the same or different speeds and directions. In some embodiments, only a single shaft may be employed. Turbine system 22 is operative to discharge an engine 10 core flow to nozzle 28.

Discharge duct 26 extends between a bypass duct discharge portion 38, a turbine discharge portion 40 and engine nozzle 28. Discharge duct 26 is operative to direct bypass flow and core flow from bypass duct discharge portion 38 and turbine discharge portion 40, respectively, into nozzle system 28. In some embodiments, discharge duct 26 may be considered a part of nozzle 28. Nozzle 28 in fluid communication with fan system 12 and turbine system 22. Nozzle 28 is operative to receive the bypass flow from fan system 12 via bypass duct 14, and to receive the core flow from turbine system 22, and to discharge both as an engine exhaust flow, e.g., a thrust-producing flow.

During the operation of gas turbine engine 10, air is drawn into the inlet of fan 12 and pressurized by fan 12. Some of the air pressurized by fan 12 is directed into compressor system 16 as core flow, and some of the pressurized air is directed into bypass duct 14 as bypass flow, which is discharged into nozzle 28 via bypass mixer 24 and discharge duct 26. Compressor system 16 further pressurizes the portion of the air received therein from fan 12, which is then discharged by compressor system 16 into diffuser 18. Diffuser 18 reduces the velocity of the pressurized air, and directs the diffused core airflow into combustion system 20. Fuel is mixed with the pressurized air in combustion system 20, and is then combusted. The hot gases exiting combustion system 20 are directed into turbine system 22, which extracts energy in the form of mechanical shaft power to drive fan system 12 and compressor system 16 via shafting system 36. The core flow exiting turbine system 22 is directed along an engine tail cone 42 and into discharge duct 26, along with the bypass flow from bypass duct 14. Discharge duct 26 is configured to receive the bypass flow and the core flow, and to discharge both as an engine exhaust flow, e.g., for providing thrust, such as for aircraft propulsion.

In some situations, it is desirable to control the ratio between the bypass flow and the core flow supplied to nozzle 28, e.g., based on engine 10 operating parameters and output requirements. For example, an engine 10 high thrust operating mode may employ a lower bypass ratio than an engine 10 high specific fuel consumption (SFC) operating mode. Bypass mixer 24 is configured to vary the bypass ratio by increasing or decreasing the bypass flow area exposed to discharge duct 26 and nozzle 28.

Figure 2A:
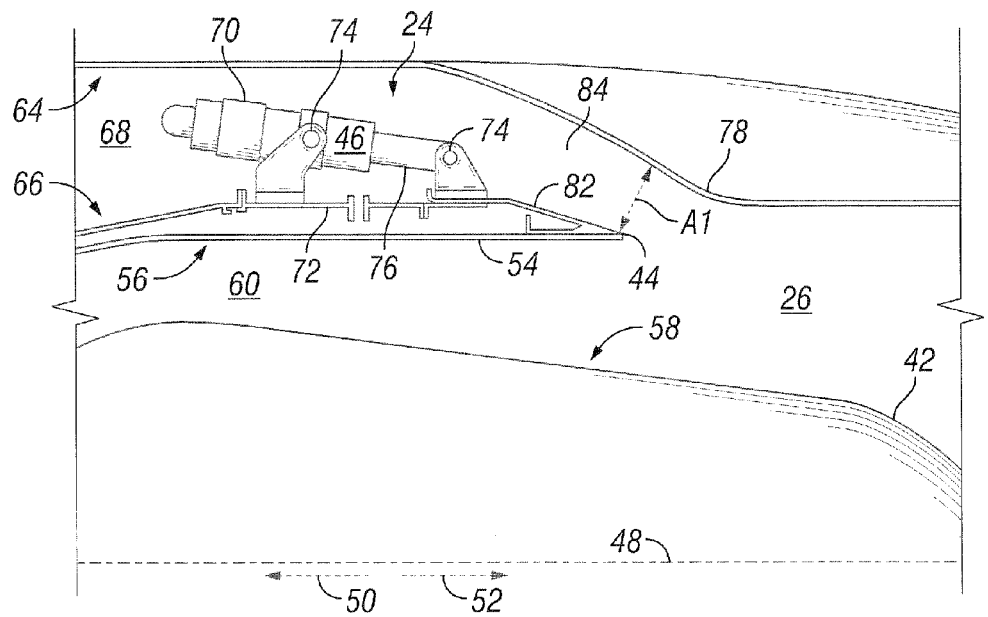
FIGS. 2A and 2B schematically illustrate some aspects of a non-limiting example of bypass mixer for a gas turbine engine in accordance with an embodiment of the present invention.
Figure 2B:
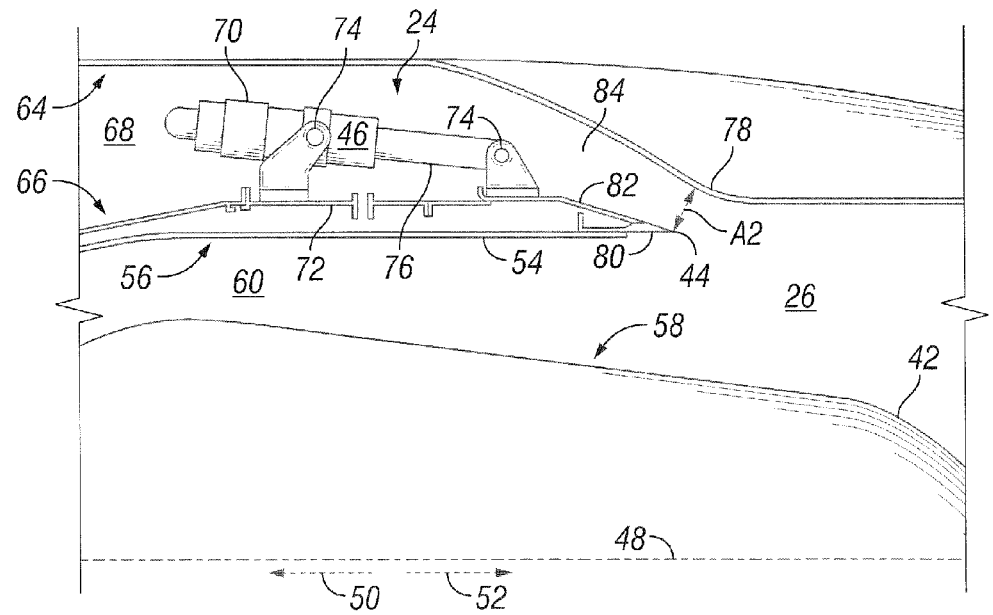

Referring to FIGS. 2A and 2B, some aspects of a non-limiting example of bypass mixer 24 in accordance with an embodiment of the present invention is schematically illustrated. Bypass mixer 24 is a variable area bypass mixer, and is configured to vary the bypass ratio of engine 10, i.e., to vary a ratio of the bypass flow to the core flow that is directed into nozzle 28 to form the engine exhaust flow. Bypass mixer 24 includes a sled 44 and a plurality of actuators 46 (only a single actuator 46 is illustrated). Actuators 46 are coupled to sled 44, and are configured to translate sled 44. In one form, each actuator 46 is an electro-mechanical actuator, e.g., a linear actuator. In other embodiments, actuators 46 may be one or more other types of actuators, including linear or rotary pneumatic and hydraulic actuator types in addition to or in place of electro-mechanical actuators. In one form, the plurality of actuators 46 are spaced apart circumferentially at different locations around engine 10. In other embodiments, other arrangements may be employed, including the use of a single actuator 46.

Actuator 46 is configured to translate sled 44 between a first position yielding a maximum bypass flow area of bypass duct 14 that is exposed to engine nozzle 28; and a second position yielding a minimum bypass flow area of bypass duct 14 exposed to engine nozzle 28. Maximum, minimum and intermediate flow areas may vary with the needs of the application. In one form, sled 44 is configured to translate parallel to an engine centerline 48. In particular, sled 44 is configured to translate in a forward direction 50 and in an aft direction 52. In other embodiments, sled 44 may be configured to translate in other directions in addition to or in place of forward direction 50 and aft direction 52. In one form, sled 44 is disposed within bypass duct 14. In other embodiments, sled 44 may be disposed in other locations internal and/or external to engine 10.

In one form, sled 44 is piloted by a guide member 54. Guide member 54 forms a part of an outer core flowpath wall 56. An inner core flowpath wall 58 is formed by tail cone 42. In other embodiments, outer core flowpath wall 56 and inner core flowpath wall 58 may be formed by other structures in addition to or in place of guide member 54 and tail cone 42, respectively. Outer core flowpath wall 56 and inner core flowpath wall 58 define a core flowpath 60 in turbine discharge portion 40 of turbine system 22. Core flowpath 60 channels core flow toward discharge duct 26 and nozzle 28.

Bypass duct 14 includes an outer flowpath wall 64 and an inner bypass flowpath wall 66. Outer flowpath wall 64 and inner bypass flowpath wall 66 define a bypass flowpath 68 that channels bypass flow toward nozzle 28. In one form, actuator 46 is disposed in bypass flowpath 68 in bypass duct 14. In other embodiments, actuator 46 may be disposed in other engine 10 locations. In one form, a forward portion 70 of actuator 46 is mounted on a fixed portion 72 of inner bypass flowpath wall 66 via a hinge joint 74. In other embodiments, forward portion 70 may be mounted in other locations, e.g., such as outer flowpath wall 64, via the same or a different mounting arrangement. In some embodiments, a hinge joint may not be employed. In one form, an aft portion 76 of actuator 46 is mounted on sled 44 via a hinge joint 74. In other embodiments, aft portion 76 may be mounted in other locations and/or otherwise coupled to sled 44.

Sled 44 is configured as a translatable flowpath wall structure. Sled 44 is disposed between core flowpath 60 and bypass flowpath 68. In one form, sled 44 is configured as a ring structure, e.g., for embodiments wherein bypass flowpath 68 is annular in shape at locations adjacent to sled 44. In other embodiments, sled 44 may take other forms. Outer bypass flowpath wall 64 includes a throat portion 78. Throat portion 78 extends radially inward, e.g., toward core flowpath 60. Throat portion 78 forms a part of bypass duct discharge portion 38. Sled 44 is positioned adjacent to throat portion 78 and upstream of discharge duct 26. In other embodiments, sled 44 may be positioned in other locations.

Sled 44 includes an inner surface 80 that forms a portion of outer core flowpath wall 56. Sled 44 also includes an outer surface 82 that forms a portion of inner bypass flowpath wall 66. Outer surface 82 of sled 44 is disposed opposite to outer bypass flowpath wall 64. Outer surface 82 may have any suitable shape. Inner surface 80 of sled 44 is disposed opposite to outer core flowpath wall 56. Inner surface 80 may have any suitable shape. In one form, throat portion 78 of outer bypass flowpath wall 64 and outer surface 82 of sled 44 form a converging nozzle 84 operative to discharge the bypass flow into discharge duct 26 and nozzle 28. In other embodiments, a converging nozzle may not be formed as between outer bypass flowpath wall 64 and outer surface 82 of sled 44.

Actuator 46 is configured to translate sled 44 between a first position yielding a maximum bypass flow area A1 and a second position yielding a minimum bypass flow area A2. In the depiction of FIGS. 2A and 2B, the bypass flow areas A1 and A2 have a shape corresponding to the frustum of a cone. In other embodiments, other shapes may be employed. In some embodiments, bypass mixer 24 is configured for a non-zero minimum area A2, whereas in other embodiments, bypass mixer 24 may be configured to provide a minimum area A2 of zero. During the operation of engine 10, actuator 46 is employed to selectively translate sled 44 in direction 50 and/or direction 52 in order to obtain a desired flow area for discharging the bypass flow into discharge duct 26, thereby obtaining a desired bypass ratio.

Embodiments of the present invention include a gas turbine engine, comprising: a fan system operative to generate a bypass flow; a bypass duct in fluid communication with the fan system and operative to transmit the bypass flow from the fan system; a compressor system in fluid communication with the fan system; a combustion system in fluid communication with the compressor system; a turbine system in fluid communication with the combustion system and operative to discharge an engine core flow; an engine nozzle in fluid communication with the fan system and the turbine system, wherein the engine nozzle is operative to receive the bypass flow and the core flow and to discharge both as an engine exhaust flow; and a variable area bypass mixer configured to vary a ratio of the bypass flow to the core flow directed into the engine nozzle to form the engine exhaust flow, wherein the variable area bypass mixer includes a translatable sled; and wherein the variable area bypass mixer is configured to translate the sled between a first position yielding a maximum bypass flow area of the bypass duct exposed to the engine nozzle and a second position yielding a minimum bypass flow area of the bypass duct exposed to the engine nozzle.

In a refinement, the bypass mixer includes an actuator coupled to the sled; and wherein the actuator is configured to translate the sled between the first position and the second position.

In another refinement, the actuator is an electro-mechanical actuator.

In yet another refinement, the sled is disposed within the bypass duct.

In still another refinement, the bypass duct includes an outer bypass flowpath wall; and wherein the sled forms at least a portion of an inner bypass flowpath wall disposed opposite to the outer bypass flowpath wall.

In yet still another refinement, the turbine system includes a discharge portion having an inner core flowpath wall; and wherein the sled forms at least a portion of an outer core flowpath wall.

In a further refinement, the bypass duct includes an outer bypass flowpath wall; wherein the turbine system includes a discharge portion having an inner core flowpath wall; and wherein the sled is configured as a ring structure disposed between the outer bypass flowpath wall and the inner core flowpath wall.

In a still further refinement, the bypass duct includes an outer bypass flowpath wall; and wherein the sled is configured to form, in conjunction with the outer bypass flowpath wall, a converging nozzle operative to discharge the bypass flow into the engine nozzle.

Embodiments include a gas turbine engine, comprising: a fan system operative to generate a bypass flow; a bypass duct in fluid communication with the fan system and operative to transmit the bypass flow from the fan system, wherein the bypass duct includes a bypass duct discharge portion operative to discharge the bypass flow; a compressor system in fluid communication with the fan system; a combustion system in fluid communication with the compressor system; a turbine system in fluid communication with the combustion system and operative to discharge an engine core flow, wherein the turbine system includes a turbine system discharge portion operative to discharge the core flow; a discharge duct in fluid communication with the turbine system discharge portion and the bypass duct discharge portion, wherein the discharge duct is configured to receive the bypass flow and the core flow, and to discharge an engine exhaust flow formed of the bypass flow and the core flow; and a translatable flowpath wall structure configured to translate in a first direction to increase a flow area of the bypass duct discharge portion exposed to the discharge duct, and to translate in a second direction to decrease the flow area.

In a refinement, the translatable flowpath wall structure is disposed between the bypass duct discharge portion and the turbine system discharge portion.

In another refinement, the engine further comprises an actuator coupled to the flowpath wall structure and operative to translate the flowpath wall structure in the first direction and in the second direction.

In yet another refinement, the actuator is disposed in the bypass duct.

In still another refinement, the bypass duct includes an outer bypass flowpath wall having a throat portion; and wherein the throat portion is shaped to extend radially inward toward the translatable flowpath wall structure.

In yet still another refinement, the translatable flowpath wall structure is disposed within the bypass duct.

In a further refinement, the bypass duct includes an outer bypass flowpath wall; and wherein the translatable flowpath wall structure is configured to form, in conjunction with the outer bypass flowpath wall, a converging nozzle operative to discharge the bypass flow into the discharge duct.

In a yet further refinement, the translatable flowpath wall structure is operative to translate between a first position yielding a maximum bypass flow area and a second position yielding a minimum bypass flow area.

In a still further refinement, the translatable flowpath wall structure is disposed upstream of the discharge duct.

In a yet still further refinement, the translatable flowpath wall structure is positioned aft of the turbine system.

Embodiments include a gas turbine engine, comprising: a fan system operative to generate a bypass flow; a bypass duct in fluid communication with the fan system and operative to transmit the bypass flow from the fan system, wherein the bypass duct includes a bypass duct discharge portion operative to discharge the bypass flow; a compressor system in fluid communication with the fan system; a combustion system in fluid communication with the compressor system; a turbine system in fluid communication with the combustion system and operative to discharge an engine core flow, wherein the turbine system includes a turbine system discharge portion operative to discharge the core flow; a discharge duct in fluid communication with the turbine system discharge portion and the bypass duct discharge portion, wherein the discharge duct is configured to receive the bypass flow and the core flow, and to discharge an exhaust flow formed of the bypass flow and the core flow; and means for varying a ratio of the bypass flow to the core flow in the discharge duct.

In a refinement, the means for varying is configured to translate between a first position yielding a maximum bypass flow area and a second position yielding a minimum bypass flow area.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:
a fan system operative to generate a bypass flow;
a bypass duct in fluid communication with the fan system and operative to transmit the bypass flow from the fan system;
a compressor system in fluid communication with the fan system;
a combustion system in fluid communication with the compressor system;
a turbine system in fluid communication with the combustion system and operative to discharge an engine core flow;
an engine nozzle in fluid communication with the fan system and the turbine system, wherein the engine nozzle is operative to receive the bypass flow and the core flow and to discharge both as an engine exhaust flow; and
a variable area bypass mixer configured to vary a ratio of the bypass flow to the core flow directed into the engine nozzle to form the engine exhaust flow, wherein the variable area bypass mixer includes an axially translatable sled structured to form a bypass exit flow area for the bypass flow as it merges with the engine core flow, the bypass exit flow area defined between a downstream end of the axially translatable sled and a sidewall; and
wherein the variable area bypass mixer is configured to axially translate the sled between a first position yielding a maximum bypass exit flow area of the bypass duct that directly provides bypass flow to the core flow and is exposed to the engine nozzle and a second position yielding a minimum bypass exit flow area of the bypass duct that directly provides bypass flow to the core flow and is exposed to the engine nozzle, the first position being upstream of the second position,
wherein the turbine system includes a discharge portion having an inner core flowpath wall; and wherein the sled forms at least a portion of an outer core flowpath wall.

2. The gas turbine engine of claim 1, wherein the bypass mixer includes an actuator coupled to the sled; and wherein the actuator is configured to translate the sled between the first position and the second position.

3. The gas turbine engine of claim 2, wherein the actuator is an electro-mechanical actuator.

4. The gas turbine engine of claim 1, wherein the sled is disposed within the bypass duct.

5. The gas turbine engine of claim 1, wherein the bypass duct includes an outer bypass flowpath wall; and wherein the sled forms at least a portion of an inner bypass flowpath wall disposed opposite to the outer bypass flowpath wall.

6. The gas turbine engine of claim 1, wherein the bypass duct includes an outer bypass flowpath wall; wherein the turbine system includes a discharge portion having an inner core flowpath wall; and wherein the sled is configured as a ring structure disposed between the outer bypass flowpath wall and the inner core flowpath wall.

7. The gas turbine engine of claim 1, wherein the bypass duct includes an outer bypass flowpath wall; and wherein the sled is configured to form, in conjunction with the outer bypass flowpath wall, a converging nozzle operative to discharge the bypass flow into the engine nozzle.

8. A gas turbine engine, comprising:
a fan system operative to generate a bypass flow;
a bypass duct in fluid communication with the fan system and operative to transmit the bypass flow from the fan system, wherein the bypass duct includes a bypass duct discharge portion operative to discharge the bypass flow;
a compressor system in fluid communication with the fan system;
a combustion system in fluid communication with the compressor system;
a turbine system in fluid communication with the combustion system and operative to discharge an engine core flow, wherein the turbine system includes a turbine system discharge portion operative to discharge the core flow;
a discharge duct in fluid communication with the turbine system discharge portion and the bypass duct discharge portion, wherein the discharge duct is configured to receive the bypass flow and the core flow, and to discharge an engine exhaust flow formed of the bypass flow and the core flow; and
a slidably translatable flowpath wall structure configured to translate in an upstream direction to increase an exit flow area of the bypass duct discharge portion exposed to the discharge duct, and to translate in a downstream direction to decrease the flow area, the exit flow area defined between the downstream end of the slidably translatable flowpath wall structure and an adjacent wall,
wherein the turbine system includes a discharge portion having an inner core flowpath wall; and wherein the translatable flowpath wall structure forms at least a portion of an outer core flowpath wall.

9. The gas turbine engine of claim 8, wherein the translatable flowpath wall structure is disposed between the bypass duct discharge portion and the turbine system discharge portion.

10. The gas turbine engine of claim 8, further comprising an actuator coupled to the flowpath wall structure and operative to translate the flowpath wall structure in the upstream direction and in the downstream direction.

11. The gas turbine engine of claim 10, wherein the actuator is disposed in the bypass duct.

12. The gas turbine engine of claim 8, wherein the bypass duct includes an outer bypass flowpath wall having a throat portion; and wherein the throat portion is shaped to extend radially inward toward the translatable flowpath wall structure.

13. The gas turbine engine of claim 8, wherein the translatable flowpath wall structure is disposed within the bypass duct.

14. The gas turbine engine of claim 8, wherein the bypass duct includes an outer bypass flowpath wall; and wherein the translatable flowpath wall structure is configured to form, in conjunction with the outer bypass flowpath wall, a converging nozzle operative to discharge the bypass flow into the discharge duct.

15. The gas turbine engine of claim 8, wherein the translatable flowpath wall structure is operative to translate between a first position yielding a maximum bypass flow area and a second position yielding a minimum bypass flow area.

16. The gas turbine engine of claim 8, wherein the translatable flowpath wall structure is disposed upstream of the discharge duct.

17. The gas turbine engine of claim 8, wherein the translatable flowpath wall structure is positioned aft of the turbine system.

* * * * *